S. B. Forbes.
Cultivator.
Nº 77,474.  Patented May 5, 1868.
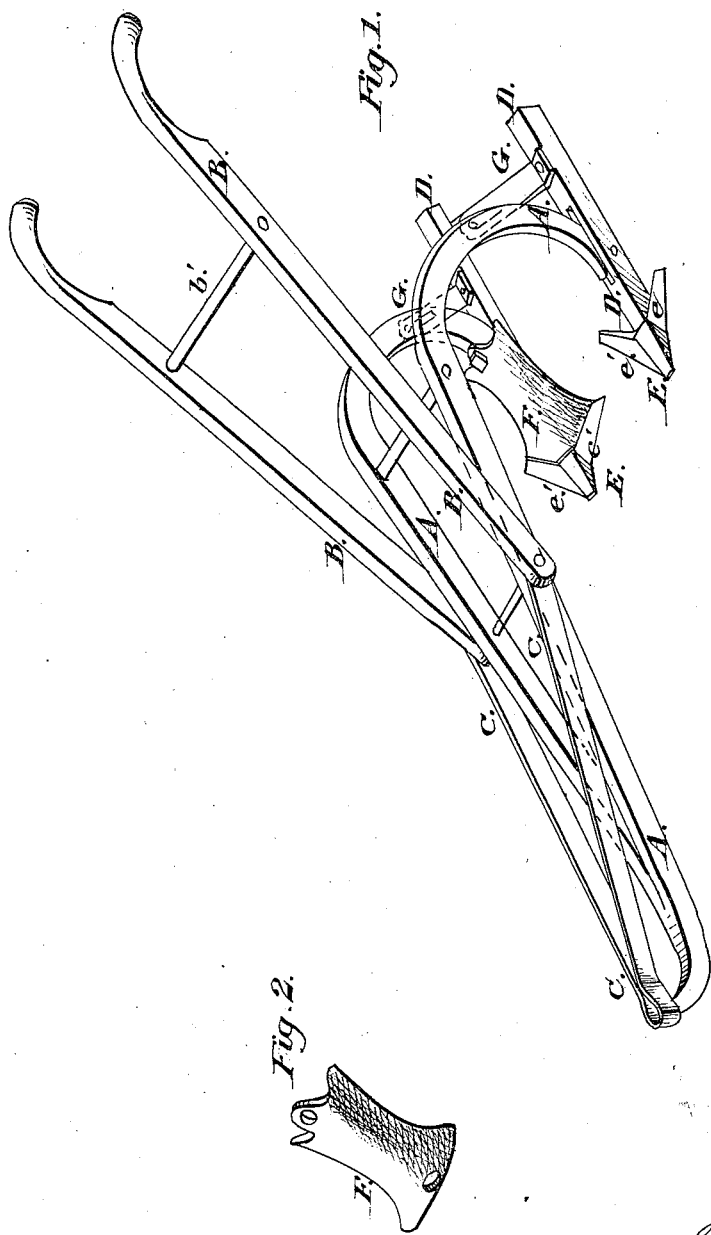

United States Patent Office.

SIMEON B. FORBES, OF NEW CUMBERLAND, WEST VIRGINIA.

Letters Patent No. 77,474, dated May 5, 1868.

IMPROVEMENT IN DOUBLE-SHOVEL CULTIVATOR.

*The Schedule referred to in these Letters Patent and making part of the same.*

TO ALL WHOM IT MAY CONCERN:

Be it known that I, SIMEON B. FORBES, of New Cumberland, in the county of Hancock, and State of West Virginia, have invented a new and useful Improvement in Double-Shovel Cultivators; and I do hereby declare that the following is a full, clear, and exact description thereof, which will enable those skilled in the art to make and use the same, reference being had to the accompanying drawings, forming part of this specification, in which—

Figure 1 is a perspective view of my improved cultivator, one of the mould-boards being removed.

Figure 2 is a detail view of one of the mould-boards.

Similar letters of reference indicate corresponding parts.

My invention has for its object to furnish an improved double-shovel cultivator, simple in construction, effective in operation, and easily operated.

And it consists in the construction and combination of the various parts, as hereinafter more fully described.

A are the beams, which are made of iron, and the rear ends of which are bent or curved downwards to form the standards.

B are the handles, the forward ends of which are connected to the beams A, and the rear ends of which are held in their proper relative positions by being connected to each other by a round or cross-bar, $b'$.

C is the draught-bar, which is made in about the form shown in fig. 1, the ends or rear part of which may be connected to the middle posts of the beams A, and the forward part of which is connected to the forward end of the beams A by a pin or bolt.

D is a horizontal bar, or sole, which is pivoted to the lower end of the beam A, and to the forward end of which the point E is attached.

The point E is made with an outwardly-projecting wing, $e'$, upon each side, as shown in fig. 1.

F is the mould-board, which is made in about the form shown in figs. 1 and 2, and the lower end of which is securely connected with the rear edge of the point E.

The upper part of the mould-board F is securely bolted to the lower curved end of the beam A, as shown in the drawings.

G is a brace-bar, the lower end of which is securely attached to the rear part of the sole or horizontal bar D, and the upper end of which is adjustably secured to the curved part of the beam A by a bolt passing through the said beam, and through a slot in the upper end of the said brace-bar, so that the said brace may be adjusted to make the ploughs run deeper or shallower, as may be desired.

I claim as new, and desire to secure by Letters Patent—

1. The combination of the sole D, double-winged point E, and double mould-board F, with each other, substantially as herein shown and described, and for the purpose set forth.

2. The combination of the adjustable brace G with the curved rear parts of the beam A, and with the sole D, substantially as herein shown and described, and for the purpose set forth.

SIMEON B. FORBES.

Witnesses:
   J. M. McFEELY,
   ELI H. McFEELY.